Figure 1:
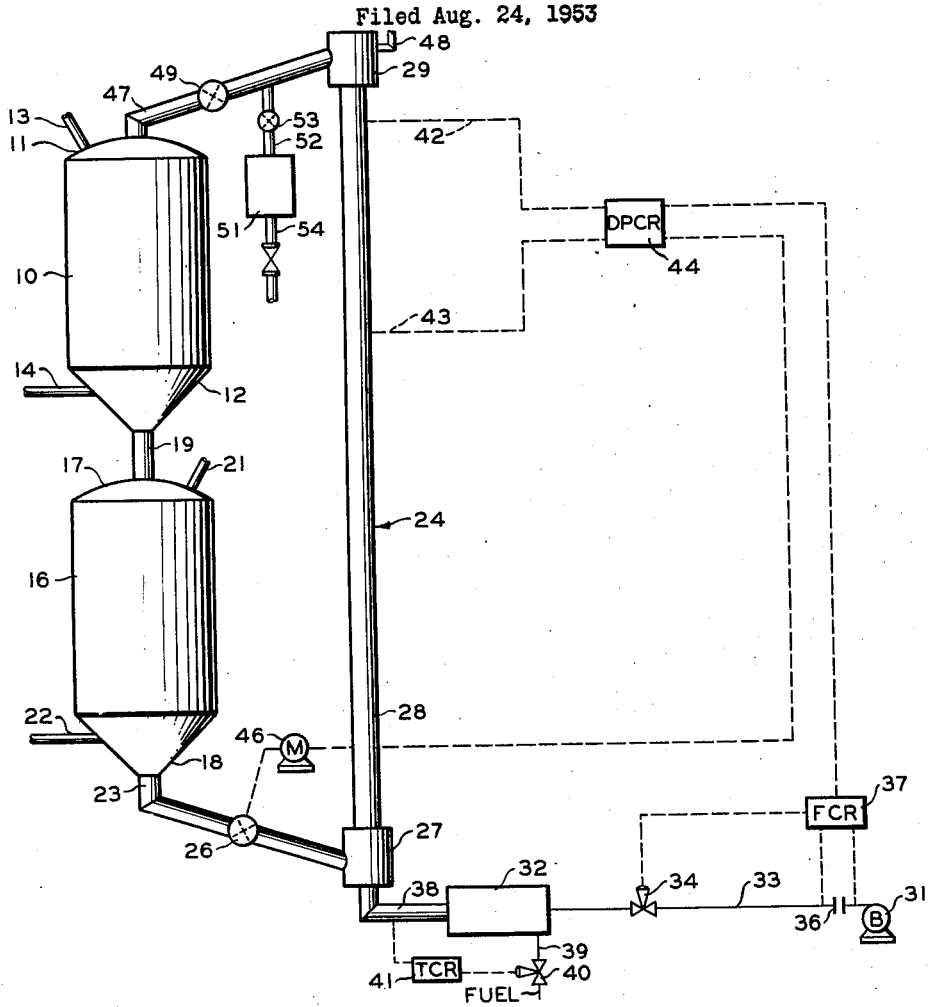

Sept. 22, 1959     R. L. McINTIRE     2,905,538

PEBBLE HEATER APPARATUS

Filed Aug. 24, 1953

INVENTOR.
R.L. MC INTIRE
BY *Hudson & Young*

ATTORNEYS

United States Patent Office 2,905,538
Patented Sept. 22, 1959

2,905,538

PEBBLE HEATER APPARATUS

Robert L. McIntire, Bartlesville, Okla., assignor to Phillips Petroleum Company, a corporation of Delaware Application August 24, 1953, Serial No. 375,854

6 Claims. (Cl. 23—284)

The invention relates to pebble heater apparatus. In one of its more specific aspects, it relates to a gas lift for elevating pebbles in a pebble heater apparatus. In another of its more specific aspects, it relates to a method of continuously measuring and recording the pebble flow rate in the gas lift of a pebble heater apparatus. In still another of its more specific aspects, it relates to the control of the pebble circulation rate in a pebble heater apparatus.

In carrying out thermal conversion processes in pebble heater apparatus, a flowing mass of solid heat exchange material heated to a high temperature by passing hot gas therethrough in a first direct heat exchange step is thereafter caused to contact gaseous reactant materials in a second direct heat exchange. The conventional pebble heater apparatus generally comprises two chambers which may be disposed in substantially vertical alignment. The solid heat exchange material is introduced into the upper portion of the first or upper chamber where the material forms a moving bed of solid heat exchange material which flows downwardly through the chamber in direct heat exchange with hot gaseous heat exchange material. In the heat exchange, the solid heat exchange material is heated to a high temperature and then passed to a second or lower chamber in which the hot solid heat exchange material is caused to contact gaseous reactant materials in a second direct heat exchange relation furnishing heat for the treatment or conversion of the gaseous materials. The solid heat exchange material, cooled as a result of the second heat exchange, emerges from the bottom of the second chamber and flows downwardly to the lower part of an elevator which elevates the material to the upper end of a chute leading into the upper portion of the first chamber.

Solid heat exchange material which is conventionally used in pebble heater apparatus is generally called "pebbles." For a more complete description of the pebbles which can be utilized, reference may be had to U.S. Patent No. 2,536,436.

The pebbles are heated in the upper chamber to temperatures generally in the range of 1400° to 3200° F. Ordinarily, pebble inlet temperatures in the lower chamber are about 100° F. to 200° F. below the highest temperatures of the pebbles within the upper chamber. In processes for the production of ethylene from light hydrocarbons, such as ethane or propane, the pebble temperatures in the lower reaction chamber are usually in the range of 1200° F. to 1800° F. In the production of acetylene by pyrolysis of hydrocarbons, temperatures in the range of 1800° F. to 3000° F. are desirable. In the practice of such processes, the cracking reaction involved is endothermic requiring for a particular hydrocarbon feed a specific amount of heat to effect the desired depth of cracking. The heat required for this reaction is delivered by the pebbles in the second heat exchange relation previously referred to. It should be apparent that in any given process the rate of flow of pebbles through the lower chamber as well as the temperature of the pebbles is determinative of the amount of heat available for the cracking reaction and the amount of hydrocarbon feed which should be introduced into the reaction zone. Furthermore, the temperature to which the pebbles are heated in the upper chamber is related to their residence time therein during which the pebbles undergo a first heat exchange with hot combustion gases. In order to operate a pebble heater apparatus so as to obtain the most efficient cracking of the hydrocarbon feed, it becomes important to be able to measure the circulation rate of the pebbles through the system and to control this rate so as to obtain the desired pebble residence times in the upper and lower chambers.

The pebble circulation rate in a pebble heater apparatus is dependent upon the amount of pebbles removed from the lower chamber and elevated to the upper chamber in a given unit of time. In pebble heater apparatus of one conventional design, a bucket type elevator is utilized to raise the pebbles to the upper heating chamber. This type of equipment has proved unsatisfactory in that it is impossible to measure with a sufficient degree of accuracy the flow rate of the pebbles being elevated from the lower to the upper chamber. Accordingly, it becomes impractical and inaccurate to base the pebble circulation rate of the entire system upon the rate of pebble flow measurements obtained when employing a bucket type elevator. By utilizing the present invention, however, it is possible to accurately determine the pebble flow rate in the elevating means and to control the pebble circulation rate in the pebble heater apparatus in accordance with such measurements.

The following objects will be attained by the various aspects of the invention.

It is an object of the present invention to provide a method for measuring the rate of pebble flow in the gas lift of a pebble heater apparatus.

Another object is to provide a method for controlling the pebble circulation rate in a pebble heater apparatus.

Still another object is to provide a means for measuring the rate of pebble flow in the gas lift of a pebble heater apparatus.

A further object is to provide a method for obtaining a continuous and accurate record of the pebble flow through a vertical gas lift.

A still further object is to provide a method for preventing the plugging of the gas lift of a pebble heater apparatus with pebbles.

Various other objects, advantages and features of the invention will become apparent from the accompanying disclosure.

In accordance with this invention, in a pebble heater system employing a gas lift to elevate the pebbles, the pressure drop occurring across a section of the gas lift conduit in which substantially steady-state conditions prevail is measured. It has been found that under certain conditions the pressure drop as measured is a function of the rate of pebble flow through the gas lift conduit. Thus, by holding constant the conditions of temperature and air flow rate under which the gas lift is operating, it is possible to measure the rate of pebble flow by measuring the pressure differential. And since the pebble circulation rate through the entire pebble heater system is dependent upon the rate of pebble flow in the gas lift, it is possible to obtain any desired circulation rate by controlling, in response to the measured pressure differential, the rate at which pebbles are admitted to the gas lift.

Figure 2:
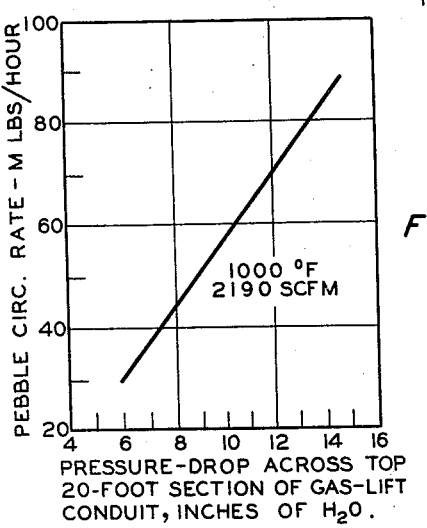

A more complete understanding of the invention may be obtained by reference to the following description and the drawing, in which:

Figure 1 is a diagrammatic illustration of one arrangement of apparatus particularly suitable for practicing the invention; and Figure 2 represents a calibration curve showing the relationship between the pressure drop across the top section of a gas lift and the pebble circulation rate in a pebble heater apparatus at the temperature and air flow rate indicated.

Referring particularly to Figure 1 of the drawing, the pebble heater apparatus comprises an upright elongated shell 10 closed at its upper and lower ends by closure members 11 and 12, respectively. Gaseous effluent outlet conduit 13 extends from the upper portion of the pebble heater chamber formed within shell 10 while heating material inlet means 14 is provided in the lower portion of that chamber. Upright elongated shell 16, closed at its upper and lower ends by closure members 17 and 18, respectively, is disposed below shell 10. Pebble conduit means such as conduit 19 or a plurality of such conduits, extending between closure member 12 of shell 10 and closure member 17 of shell 16, connects the pebble heater chamber with the reactor chamber formed within shell 16. Gaseous effluent outlet conduit 21 is disposed in the upper portion of the reactor chamber while gaseous material inlet conduit 22 is provided in the lower portion of that chamber. Pebble outlet conduit 23 extends downwardly from closure member 18 of the reactor chamber, and is connected to the lower end portion of elevator 24. Pebble feeder 26 is provided intermediate the ends of pebble outlet conduit 23 and may be any one of the conventional pebble feeders utilized such as a star valve, a gate valve, a rotatable table feeder, or the like. It is also within the scope of the invention to omit pebble feeder 26 and provide for the control of pebble flow by a means associated with elevator 24 as will be described more in detail hereinafter.

Elevator 24, which is of the gas-lift type, comprises engaging pot 27, gas lift conduit 28, and separator chamber 29. The outlet of gas lift blower 31 is connected to heater 32 by means of line 33 which contains valve 34 and orifice 36. Flow controller-recorder 37 connected across orifice 36 and operatively connected to valve 34 provides means for measuring and controlling the rate of flow of gas through line 33. Lift-gas inlet conduit 38 extends from the lower end of engaging pot 27 and is attached to the outlet of heater 32. Heater 32 may be in the form of a burner supplied with a suitable fuel, such as natural gas, through line 39 under the control of valve 40. The desired temperature can be maintained in conduit 38 by means of temperature controller-recorder 41 which is operatively connected to valve 40 and conduit 38. Lines 42 and 43, which communicate at different vertically spaced points with the upper portion of gas lift conduit 28, are connected to differential pressure controller-recorder 44, thereby providing means for measuring the pressure differential across the upper section of the gas lift conduit. The distance between the pressure taps, i.e., lines 42 and 43, can vary within wide limits, the only limitation being that steady-state conditions prevail in the section of the gas-lift conduit across which they are placed. Controller-recorder 44 is operatively connected to variable speed motor 46, which, in turn, is operatively connected to pebble feeder 26. Alternatively, feeder 26 may be a gate valve adapted to restrict the flow of pebbles through conduit 23, and motor 46 may be a reversible motor adapted to adjust the position of gate valve 26 under the control of differential pressure controller 44. Similarly, the rate of flow of pebbles into air lift conduit 28 may be controlled utilizing means disclosed in the co-pending application of Lloyd E. Dean, Serial No. 309,252, filed September 12, 1952, wherein a movable sleeve surrounds the portion of lift conduit 28 into which the pebbles are introduced, the rate of pebble flow being governed by the position of the sleeve with relation to the openings in the wall of conduit 28. In this instance motor 46, actuated by controller-recorder 44, will adjust the position of the moveable sleeve to admit pebbles at the desired rate. Other known means such as pneumatic control means for controlling pebble flow may be used similarly in conjunction with controller-recorder 44.

Separator chamber 29 which encompasses the upper end portion of gas lift conduit 28 is connected at its lower end portion to pebble inlet conduit 47. Gaseous effluent conduit 48 is provided in the upper end portion of separator chamber 29. Pebble inlet conduit 47 containing a flow control means such as gate valve 49 extends downwardly from separator chamber 29 to the upper end portion of the pebble heater chamber. Measuring pot 51 is connected to pebble inlet conduit 47 by conduit 52 also containing a flow control means such as gate valve 53 and has an outlet conduit 54. The measuring pot provides auxiliary means for measuring the rate of flow of pebbles passing into the pebble heater chamber, and may be used for the purpose of calibrating the differential pressure-controller-recorder. A measuring pot which can be advantageously used with this invention is disclosed by D. S. Hall in co-pending U.S. application, Serial No. 400,462, filed December 28, 1953, now U.S. Patent No. 2,797,335.

In the operation of the pebble heater apparatus of Figure 1, pebbles are heated in the pebble heater chamber formed within shell 10 by contact with hot gaseous heat exchange material which may result from the combustion of fuel outside of the heater chamber or in the lower portion of that chamber in a combustion zone separated from the pebble mass, or by burning a fuel in direct contact with the pebble mass within the chamber. Pebbles are introduced into the pebble heater chamber through pebble inlet conduit 47 and form a contiguous gravitating mass which extends downwardly through shell 10, pebble conduit 19, shell 16, and pebble outlet conduit 23 to feeder 26, or to engaging pot 27 if feeder 26 is omitted. The pebbles are heated in the pebble heater chamber to temperatures generally in the approximate range of 1400° F. to 3200° F., and thereafter the hot pebbles are gravitated through conduit 19 into the upper portion of the reaction chamber formed within shell 16. Usually pebble inlet temperatures in the reactor are about 100° F. to 200° F. below the highest pebble temperature within the upper chamber. Gaseous reactant materials introduced into the reaction chamber through inlet conduit 22 contact the gravitating mass of hot pebbles and undergo reaction. The product-containing gas is withdrawn through gaseous effluent outlet conduit 21 and thereafter passed to quenching means and a purification system, not shown.

The cooled pebbles flow from the bottom of the reaction chamber through pebble outlet conduit 23 and pass therethrough into engaging pot 27 at a rate dependent upon the operation of the pebble feeder means employed. In the engaging pot, the pebbles contact a stream of lift-gas, such as air, which is introduced into the lower end of the engaging pot through lift-gas inlet conduit 38. Air under a pressure and at a rate of flow sufficient to lift the pebbles from engaging pot 27 to the top of elevator 24 is provided by blower 31. Prior to entry into the elevator through conduit 38, the air is passed through heater 32 in order to raise the air temperature to the approximate temperature of the pebbles, thereby preventing thermal shock. The desired temperature in conduit 38 is continuously maintained by varying the amount of fuel supplied burner 32 through line 39 in accordance with the setting of temperature controller-recorder 41 operatively connected to valve 40. The pebbles are raised by the air stream through gas-lift conduit 28 to the top of the elevator where the pebbles fall out of the air stream in separator chamber 29 and pass down pebble inlet conduit 47 toward the top of the pebble heater chamber. The air is withdrawn from the separator chamber through gaseous effluent conduit 48.

It has been found that the pressure drop across a section of gas-lift conduit 28 wherein steady-state conditions prevail varies directly as the rate of pebble flow through that conduit. Lines 42 and 43 communicate with conduit 28 at two points in a section of that conduit where such conditions exist. The pressure drop across the section to which leads 42 and 43 are connected is indicated by differential pressure controller-recorder 44. By directly measuring the number of pounds of pebbles flowing through gas lift conduit 28 and conduit 47 in a unit of time, it is possible to prepare calibration curves in terms of pebble circulation rate and pressure drop across a section of the gas lift conduit for any given unit apparatus. From these calibration curves, the pebble circulation rate of the entire system can be easily and readily determined by merely noting the pressure drop across the upper portion of the gas lift conduit. In the actual preparation of the calibration curves, pebbles leaving separator chamber 29 are diverted from their usual passage through pebble conduit 47 by means of gate valve 49, and passed into measuring pot 51. The time necessary to fill measuring pot 51 to a predetermined level is noted, and by determining the weight of pebbles contained in the measuring pot the amount of pebbles flowing through the gas lift conduit is easily arrived at. Since the pressure drop across the gas lift conduit is substantially constant for the measured rate of pebble flow, a point of the calibration curve is thereby located. By varying the rate at which pebbeles enter the gas-lift conduit, for example by changing the speed of motor 46 and feeder 26, additional points on the calibration curve can be readily determined. It is to be noted that both the temperature and the flow rate of the lift gas should be held constant for any given calibration.

It is also within the contemplation of the present invention to continuously control the pebble circulation rate of the pebble heater system in accordance with the pressure differential existing across the upper portion of the gas lift conduit. Thus, having determined the pebble circulation rate required for a specific process, differential pressure controller-recorder 44, operatively connected to motor 46, automatically varies the rate at which pebbles are passed through conduit 23 into gas-lift conduit 28 so as to obtain the particular pressure drop across that conduit necessary for the desired circulation rate. Alternatively, differential pressure controller-recorder 44 can be operatively connected to means located within engaging pot 27 so as to vary the amount of pebbles entering gas-lift conduit 28.

Still again, it is within the scope of the present invention to vary the amount of lift gas supplied to the gas-lift elevator in accordance with the pressure differential existing across the upper portion of the gas-lift conduit so as to prevent any plugging of the gas-lift conduit with pebbles. It has been found that when the pebble density in the gas-lift conduit exceeds a predetermined value, plugging of the gas-lift conduit with pebbles results. Since the pressure drop across the upper portion of the gas-lift conduit varies with the pebble density, any increase in pebble density is indicated by a corresponding increase in pressure drop. Accordingly, differential pressure controller-recorder 44 can be used to reset flow controller-recorder 37 so that additional lift gas is supplied to gas-lift conduit 28 when a pressure drop above a predetermined value is indicated thereby. And when the pressure drop returns to a value indicative of the desired pebble density, controller-recorder 44 again operates to reset flow controller-recorder 37, thereby decreasing the flow of lift gas to the gas lift conduit. A positive means is thus provided for ensuring continuous operation of the pebble heater apparatus without any plugging of the gas-lift elevator which might result from inadvertent surges of pebbles through the pebble feeder.

The following illustrative example, which is not intended to be unduly limitative of the invention, will further assist in an understanding of the present invention.

For this example, a 10-inch gas-lift conduit, 90 feet long, is utilized and the pressure drop across the top 20 feet of this conduit is measured under different conditions of operation. The quantity of pebbles flowing through the gas-lift conduit in a given unit of time is determined by a sample weighing procedure for each specific pressure drop measurement. The information obtained is plotted on a graph as illustrated in Figure 2 in which the ordinate represents the pebble circulation rate in thousands of pounds per hour while the abscissa represents the pressure drop in inches of $H_2O$ across the top 20-foot section of the gas-lift conduit.

It is apparent that from a knowledge of the pressure drop across the top 20-foot section of the gas-lift conduit, the pebble circulation rate can be readily determined from the calibration curve of Figure 2. The temperature of the air is 1000° F., and the air flow rate is 2190 standard cubic feet per minute. Similar curves at 100-degree increments of temperature may be prepared as required for other conditions of operation. The sensitivity of the calibration depicted in Figure 2 is 6810 pounds of pebbles per inch of water differential pressure. This sensitivity can be increased by increasing the distance between the pressure taps, as for example to 3760 pounds per inch of water with pressure taps 40 feet apart.

It will be apparent that in accordance with the present invention I have provided a comparatively simple and reliable method of determining the circulation rate of pebbles in a pebble heater apparatus. And furthermore it will be evident that I have provided an accurate and reliable method of controlling the pebble circulation rate so that a constant rate can be continuously maintained as required for a specific process. In discussing and illustrating the present invention, the pebble heater apparatus has been described with a certain degree of particularity. It is not intended, however, to limit the invention to any specific apparatus, but rather the invention is applicable to any suitation where it is desired to determine the flow rate of particulate solid material being conveyed through a conduit by means of a gas.

As will be evident to those skilled in the art, various modifications of this invention can be made or followed in the light of the foregoing disclosure and discussion without departing from the spirit or scope of the disclosure.

I claim:

1. An improved pebble heater system which comprises, in combination, a first closed, upright, elongated shell; a pebble inlet in the upper end of said first shell; gaseous effluent means in the upper end of said first shell; gaseous material inlet means in the lower end portion of said first shell; a second closed, upright, elongated shell positioned below said first shell; pebble conduit means connecting the lower end portion of said first shell to the upper end portion of said second shell; gaseous effluent outlet means in the upper end portion of said second shell; gaseous material inlet means in the lower end portion of said second shell; pebble outlet means in the lower end of said second shell; a gas-lift elevator comprising an engaging pot, a gas-lift conduit and a separator chamber, said engaging pot being connected to the lower end of said pebble outlet means; a pebble conduit extending between said separator chamber and said pebble inlet; lift gas inlet means connected to the lower end of said engaging pot; a gaseous effluent conduit in the upper end portion of said separator chamber; means for indicating the pressure differential at two vertically spaced points within the upper portion of said gas-lift conduit; means, responsive to said last mentioned means, for varying the amount of pebbles passing through said pebble outlet means into said engaging pot; means for regulating the flow of lift gas supplied to said lift gas inlet means; and means for maintaining the lift gas at a desired temperature.

2. The apparatus of claim 1 in which said means for regulating the flow of lift gas is operatively connected to said means for indicating pressure differential.

3. A control system for regulating the flow of particulate solid material through a gas-lift conduit, said conduit having a first solid material conduit means and a lift gas inlet means connected to its lower end and a second solid material conduit means and a lift gas outlet means connected to its upper end, which comprises means for indicating the pressure differential at two vertically spaced points within the upper portion of said gas-lift conduit; means, responsive to said last mentioned means, for varying the amount of particulate solid material passing through said first solid material conduit means into the lower end of said gas-lift conduit; means for regulating the flow of lift gas supplied to said lift gas inlet means; and means for maintaining the lift gas at a desired temperature.

4. The apparatus of claim 3 in which said means for regulating the flow of lift gas is operatively connected to said means for indicating pressure differential.

5. In pebble heater apparatus which comprises, in combination, a first closed, upright, elongated shell, a pebble inlet in the upper end of said first shell, gaseous effluent means in the upper end of said first shell, gaseous material inlet means in the lower end portion of said first shell, a second closed, upright, elongated shell positioned below said first shell, pebble conduit means connecting the lower end portion of said first shell to the upper end portion of said second shell, gaseous effluent outlet means in the upper end portion of said second shell, gaseous material inlet means in the lower end portion of said second shell, pebble outlet means in the lower end of said second shell, a gas-lift elevator comprising an engaging pot, a gas-lift conduit and a separator chamber, said engaging pot being connected to the lower end of said pebble outlet means, a pebble conduit extending between said separator chamber and said pebble inlet, lift gas inlet means connected to the lower end of said engaging pot, and a gaseous effluent conduit in the upper end portion of said separator chamber, the improvement comprising means for indicating the pressure differential at two vertically spaced points within the upper portion of said gas-lift conduit; means, responsive to last-mentioned means, for varying the amount of pebbles passing through said pebble outlet means into said engaging pot; means for regulating the flow of lift gas supplied to said lift gas inlet means; and means for maintaining the lift gas at a desired temperature.

6. The apparatus of claim 5 in which said means for regulating the flow of lift gas is operatively connected to said means for indicating pressure differential.

References Cited in the file of this patent

UNITED STATES PATENTS

| | | |
|---|---|---|
| 2,404,937 | Anderson | July 30, 1946 |
| 2,421,861 | Zeeh | July 10, 1947 |
| 2,640,731 | Hill | June 2, 1953 |
| 2,675,999 | Bearer | Apr. 20, 1954 |
| 2,697,640 | Newman | Dec. 21, 1954 |